(12) United States Patent  (10) Patent No.: US 9,176,769 B2
Raghunathan et al.  (45) Date of Patent: Nov. 3, 2015

(54) PARTITIONED ARRAY OBJECTS IN A DISTRIBUTED RUNTIME

(75) Inventors: Sudarshan Raghunathan, Cambridge, MA (US); Richard A. Warren, Acton, MA (US); Adam P. Jenkins, Marlborough, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 642 days.

(21) Appl. No.: 13/539,250

(22) Filed: Jun. 29, 2012

(65) Prior Publication Data

US 2014/0006473 A1  Jan. 2, 2014

(51) Int. Cl.
*G06F 12/02* (2006.01)
*G06F 15/16* (2006.01)
*G06F 9/54* (2006.01)
*G06F 9/46* (2006.01)

(52) U.S. Cl.
CPC ............... *G06F 9/465* (2013.01); *G06F 9/548* (2013.01); *G06F 12/0261* (2013.01)

(58) Field of Classification Search
CPC . G06F 9/465; G06F 12/0261; G06F 12/0269; G06F 9/5072
See application file for complete search history.

(56) References Cited

U.S. PATENT DOCUMENTS

| | | | |
|---|---|---|---|
| 5,095,522 A | 3/1992 | Fujita et al. | |
| 5,999,987 A | 12/1999 | O'Farrell et al. | |
| 7,159,211 B2 | 1/2007 | Jalan et al. | |
| 7,346,901 B2 | 3/2008 | Syme et al. | |
| 7,676,791 B2 | 3/2010 | Hamby et al. | |
| 7,725,679 B1 | 5/2010 | Anderson et al. | |
| 7,743,087 B1 | 6/2010 | Anderson et al. | |
| 7,783,686 B2 | 8/2010 | Gates et al. | |
| 7,853,937 B2 | 12/2010 | Janczewski | |
| 8,046,746 B2 | 10/2011 | Tillmann et al. | |
| 8,156,153 B2 | 4/2012 | Wang et al. | |
| 8,296,743 B2 | 10/2012 | Linderman et al. | |
| 8,458,680 B2 | 6/2013 | Crutchfield et al. | |
| 8,739,137 B2 | 5/2014 | Siskind et al. | |
| 8,745,603 B2 | 6/2014 | McGuire et al. | |
| 2003/0115573 A1 | 6/2003 | Syme et al. | |

(Continued)

OTHER PUBLICATIONS

Hoogerwerf, R., "The 'Cloud Numerics' Programming and runtime execution model" (Jan. 11, 2012), pp. 1-11 [retrieved from http://blogs.msdn.com/b/cloudnumerics/archive/2012/01/11/the-cloud-numerics-programming-and-runtime-execution-model.aspx].*

(Continued)

*Primary Examiner* — Brian W Wathen
(74) *Attorney, Agent, or Firm* — Brian Haslam; Aaron Hoff; Micky Minhas

(57) ABSTRACT

Embodiments are directed to using object serialization to communicate references to shim objects and to managing memory on worker processes of a distributed software application. In one scenario, a computer system instantiates shim objects on one or more ranks of a distributed application. The shim objects are configured to store a reference to an instance of a native partitioned array, where the reference includes a unique identifier for the native partitioned array instance. The computer system then serializes the shim objects for communication of the stored references from the master rank of the distributed application to various other worker ranks of the distributed application. Then, upon serializing the shim objects, the computer system communicates the shim object's stored references to the other worker ranks of the distributed application.

20 Claims, 5 Drawing Sheets

Figure 1

(56) References Cited

U.S. PATENT DOCUMENTS

| | | | |
|---|---|---|---|
| 2003/0159130 | A1 | 8/2003 | Broussard et al. |
| 2005/0102353 | A1 | 5/2005 | Murphy et al. |
| 2005/0149903 | A1 | 7/2005 | Archambault et al. |
| 2005/0240621 | A1 | 10/2005 | Robertson et al. |
| 2007/0028210 | A1 | 2/2007 | Meijer et al. |
| 2007/0124363 | A1* | 5/2007 | Lurie et al. ............. 709/202 |
| 2007/0220531 | A1* | 9/2007 | Korn ...................... 719/328 |
| 2008/0195646 | A1 | 8/2008 | Meijer et al. |
| 2008/0228853 | A1 | 9/2008 | Brinck et al. |
| 2008/0320453 | A1 | 12/2008 | Meijer et al. |
| 2009/0113216 | A1 | 4/2009 | Chen et al. |
| 2010/0162211 | A1 | 6/2010 | Ostrovsky et al. |
| 2010/0211753 | A1 | 8/2010 | Ylonen |
| 2010/0235412 | A1 | 9/2010 | Kawachiya et al. |
| 2010/0299660 | A1 | 11/2010 | Torgersen et al. |
| 2011/0010715 | A1 | 1/2011 | Papakipos et al. |
| 2011/0022794 | A1 | 1/2011 | Jibbe et al. |
| 2011/0179402 | A1 | 7/2011 | Buckley et al. |
| 2011/0265067 | A1 | 10/2011 | Schulte et al. |
| 2011/0321010 | A1 | 12/2011 | Wang |
| 2012/0030672 | A1 | 2/2012 | Zygmuntowicz et al. |
| 2012/0066193 | A1* | 3/2012 | King et al. ............. 707/704 |
| 2012/0185824 | A1 | 7/2012 | Sadler et al. |
| 2014/0007060 | A1 | 1/2014 | Warren et al. |
| 2014/0137087 | A1 | 5/2014 | Cimadamore et al. |
| 2014/0189662 | A1 | 7/2014 | Mameri et al. |

OTHER PUBLICATIONS

Newton, T., "Demystifying Shims—or—Using the App Compat Toolkit to make your old stuff work with your new stuff" (Jun. 17, 2011), pp. 1-6 [retrieved from http://blogs.technet.com/b/askperf/archive/2011/06/17/demystifying-shims-or-using-the-app-compat-toolkit-to-make-your-old-stuff-work-with-your-new-stuff.aspx].*

Liang, S., "The Java Native Interface" (1999), Addison-Wesley, pp. 1-168.*

Box, J.; Fox, D.; Wells, J.; Wilson, J., "An Introduction to P/Invoke and Marshaling on the Microsoft .Net Compact Framework" (Mar. 2003), pp. 1-8 [retrieved from https://msdn.microsoft.com/en-us/library/aa446536.aspx].*

Shapiro, M.; Dickman, P.; Plainfosse, D., "SSP chains: robust, distributed references supporting acyclic garbage collection" (May 24, 2006), pp. 1-41 [retrieved from https://hal.inria.fr/inria-00074876/document].*

U.S. Appl. No. 13/828,981, filed Mar. 14, 2013, Warren et al.

Kovari, et al., "WebSphere and .Net Coexistence", In Redbooks of IBM, Mar. 2004, 612 pages.

"Cutting Edge: Collections and Data Binding", Published May 2005, Available at <<http:msdn.microsoft.com/en-us/magazine/cc163798.aspx>>.

Strahl, Rick, "Visual FoxPro Web Services Revisited", Published Oct. 2007, Available at <<http://www.code-magazine.com/articleprint.aspx?quickid=0703062&pringmode=true>>.

Serviceware Downloads, Retrieved on: Feb. 21, 2013, Available at: http://www.idesign.net/Downloads.

Meier, et al., "Improving .Net Application Performance and Scalability", Published on: May 2004, Available at: http://msdn.microsoft.com/en-in/library/ff647768.aspx.

Arabe, et al., "Dome: Parallel Programming in a Distributed Computing Environment", In Proceedings of the 10th International Parallel Processing Symposium, Apr. 15, 1996, pp. 218-224.

Chang, et al., "Evaluating the Performance Limitations of MPMD Communication", In Proceedings of the ACM/IEEE conference on Supercomputing (CDROM), Nov. 15, 1997, pp. 1-10.

U.S. Appl. No. 13/828,981, Mar. 26, 2014, Office Action.

Office Action dated Apr. 24, 2014 cited in U.S. Appl. No. 13/539,244.

Hassen, et al., "HAWK: A Runtime System for Partitioned Objects", In Proceedings of Parallel Algorithms and Applications, vol. 12, Issue 1-3, Aug. 1997, pp. 205-230.

Sinha, et al., "Adaptive Runtime Partitioning of AMR Applications on Heterogeneous Clusters", In Proceedings of the 3rd IEEE International Conference on Cluster Computing, Mar. 2001, pp. 435-442.

Hassen, Saniya Ben, "Prefetching Strategies for Partitioned Shared Objects", In Proceedings of the 29th Annual Hawaii International Conference on System Sciences, Jan. 3, 1996, pp. 261-270.

Cardelli, Luca, "Obliq a Language with Distributed Scope", Published on: Jun. 3, 1994, Available at: http://www.hpl.hp.com/techreports/Compaq-DEC/SRC-RR-122.pdf.

Notice of Allowance dated Aug. 1, 2014 cited in U.S. Appl. No. 13/828,981.

Dragos, et al., "Compiling Generics Through User-Directed Type Specialization", 2009 ACM, ICOOOLPS'09, Jul. 6-10, 009, Genova, Italy, pp. 1-6.

Allen, et al., "Type Checking Modular Multiple Dispatch with Parametric Polymorphism and Multiple Inheritance", 2011 ACM, OOPSLA'11, Oct. 22-27, 2011, Portland, Oregon, USA, pp. 1-20.

Vangas, et al., "Strongly Typed Metadata Access in Object Oriented Programming Languages with Reflection Support", Baltic J. Modern Computing, vol. 1 (2013), Jul. 30, 2013, No. 1, 77-10, 77-100.

Milewicz, et al., "SimpleConcepts: Support for Constraints on Generic Types in C++", Sep. 8-11, 2013 IEEE, pp. 1535-1540.

Notice of Allowance dated Sep. 2, 2014 cited in U.S. Appl. No. 13/539,244.

* cited by examiner

PARTITIONED ARRAY OBJECTS IN A DISTRIBUTED RUNTIME

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be distributed over multiple different computer systems. Such applications are referred to as "distributed applications". These applications may be divided into different portions, and each portion may be executed in parallel with the other portions. Similarly, applications may be configured to process data arrays. These arrays may be distributed arrays which are distributed over multiple different databases. Performing operations on these distributed arrays, however, is neither straightforward nor automatic.

BRIEF SUMMARY

Embodiments described herein are directed to using object serialization to communicate references to shim objects and to managing memory on worker processes of a distributed software application. In one embodiment, a computer system instantiates shim objects on one or more ranks of a distributed application. The shim objects are configured to store a reference to an instance of a native partitioned array, where the reference includes a unique identifier for the native partitioned array instance. The computer system then serializes the shim objects for communication of the stored references from the master rank of the distributed application to various other worker ranks of the distributed application. Then, upon serializing the shim objects, the computer system communicates the shim object's stored references to the other worker ranks of the distributed application.

In another embodiment, a computer system manages memory on worker processes of a distributed software application. The computer system determines that a distributed software function has finished processing. The distributed software function includes various shim objects instantiated on a master rank as well as other worker ranks of the distributed application. As above, the shim objects are configured to store a reference to an instance of a native partitioned array, where the reference includes a unique identifier for the native partitioned array instance. Then, upon determining that the distributed software application has finished processing, the shim objects instantiated on the worker ranks are allowed to go out of scope. The computer system marks the out-of-scope worker ranks for garbage collection and removes the worker ranks marked for garbage collection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
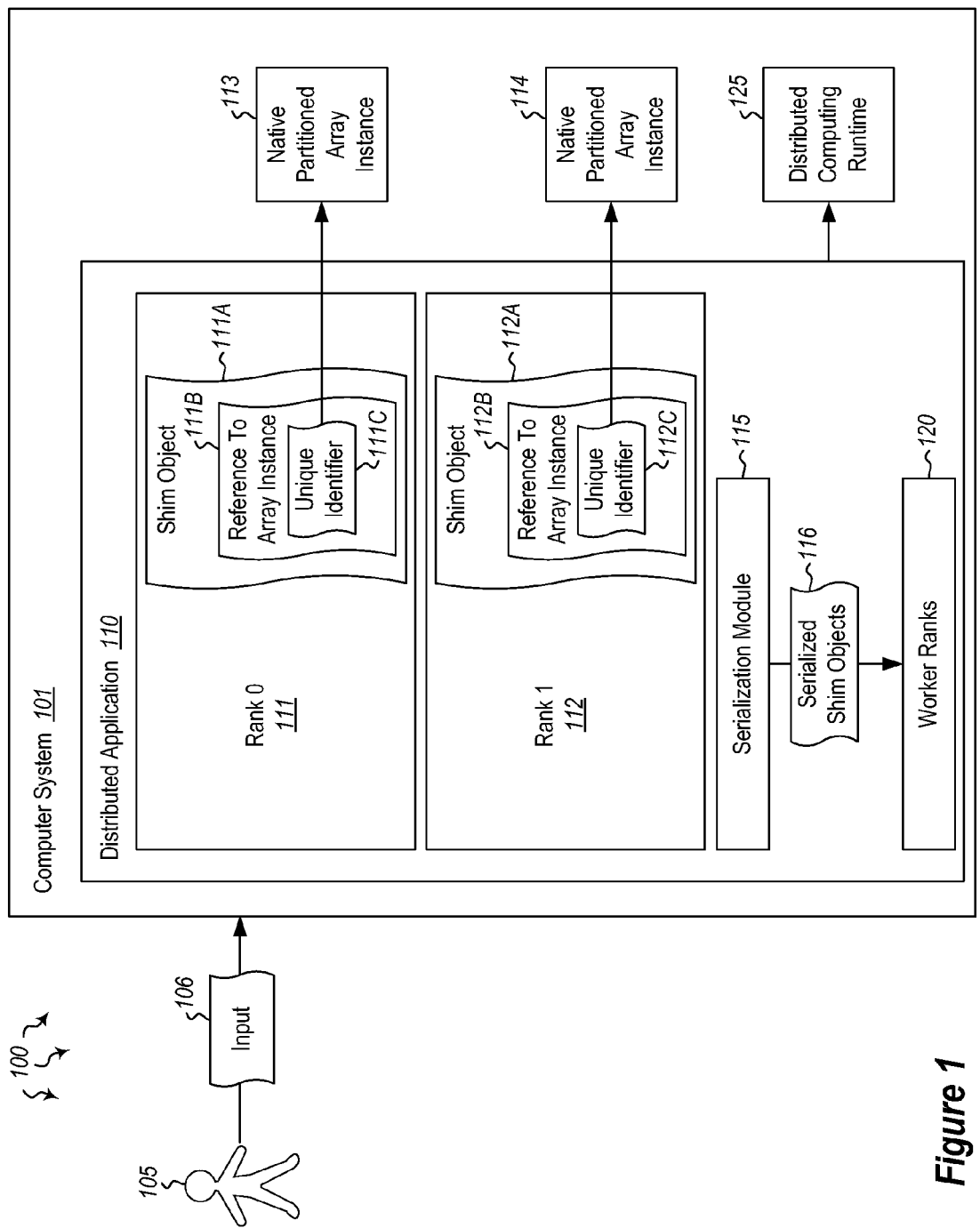
FIG. 1 illustrates a computer architecture in which embodiments of the present invention may operate including using object serialization to communicate references to shim objects and managing memory on worker processes of a distributed software application.

Embodiments described herein are directed to using object serialization to communicate references to shim objects and to managing memory on worker processes of a distributed software application. In one embodiment, a computer system instantiates shim objects on one or more ranks of a distributed application. The shim objects are configured to store a reference to an instance of a native partitioned array, where the reference includes a unique identifier for the native partitioned array instance. The computer system then serializes the shim objects for communication of the stored references from the master rank of the distributed application to various other worker ranks of the distributed application. Then, upon serializing the shim objects, the computer system communicates the shim object's stored references to the other worker ranks of the distributed application.

In another embodiment, a computer system manages memory on worker processes of a distributed software application. The computer system determines that a distributed software function has finished processing. The distributed software function includes various shim objects instantiated on a master rank as well as other worker ranks of the distributed application. As above, the shim objects are configured to store a reference to an instance of a native partitioned array, where the reference includes a unique identifier for the native partitioned array instance. Then, upon determining that the distributed software application has finished processing, the shim objects instantiated on the worker ranks are allowed to go out of scope. The computer system marks the out-of-scope worker ranks for garbage collection and removes the worker ranks marked for garbage collection.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes various different modules for performing a variety of different functions. For instance, the computer system includes a serialization module 115. The serialization module may be configured to serialize shim objects (e.g. 111A and 112A). The shim objects may be instantiated on various ranks of a distributed application. For example, distributed application 110 may have rank 0 (111) and rank 1 (112), as well as worker ranks 120 (rank 1 may be part of the worker ranks, while rank 0 may be referred to as a master rank). The shim objects are configured to store a reference (e.g. reference 111B) to an instance of a native partitioned array (e.g. 113). The reference includes a unique identifier (e.g. 111C) for the native partitioned array instance 113.

In addition to serialization, various embodiments that perform memory management of partitioned array data structures are provided. These serialization and memory management functions may be exposed to end-users (such as user 105) of a distributed-computing runtime 125. From the user's perspective, the distributed application 110 may have a single logical thread of execution that performs aggregate operations on local and distributed objects. However, aggregate operations on partitioned arrays, in turn, may use a command-dispatch mechanism in the distributed runtime 125 to operate on the arrays (e.g. 113 and 114) in parallel. The design of the partitioned arrays described herein may be split into two parts: 1) a collection of language-independent objects allocated on the native (e.g. C programming language runtime) heap and 2) a thin shim data structure (e.g. shim object 111A or 112A) that is allocated in the client environment and exposed to the end-user 105. Embodiments described herein cover the translation of operations on the shim objects to operations on the underlying partitioned arrays in conjunction with the distributed runtime 125.

Embodiments herein may implement serialization and object-disposal mechanisms that, at least in some cases, are already built into the client-side development environment to keep the amount of client-specific serialization and object-disposal logic in the language-independent runtime to a minimum. This allows the runtime to be targeted to a number of client programming languages, as long as those languages support basic operations such as user-overridable serialization and some means to run finalizers (deterministically or otherwise). In addition to distributed function execution mechanisms, embodiments described herein include an object model in the native runtime system that exposes a set of local and distributed array types.

Each distributed or partitioned array instance (e.g. 113 or 114) consists of metadata that describes the global dimensions of the array as well what part of the global array the partitioned array owns. Moreover, each partitioned array instance is associated with a unique identifier 111C. Each unique identifier is associated with one distributed array instance. The unique identifier for a distributed array may be applied at the time of the array's creation and, at least in some embodiment, does not change during the array's lifetime. On each process in the distributed runtime 125, a particular identifier refers to the same instance of the distributed array (e.g. unique identifier 112C refers to array instance 114). To guarantee this property, distributed arrays are created in a collective manner on all processes in the runtime, but can be destroyed at different points in time (i.e., at least in some embodiments, creation requires synchronization but destruction does not).

A singleton registry object on each process in the runtime contains the mapping between an identifier and a distributed array. The lifetime of local and/or distributed objects in the native runtime is managed using reference counting principles. When a new partitioned array instance is first created in the native runtime, its reference count is set to one. When an instance of a native partitioned array on a given process is assigned to a new reference, its reference count is incremented. Similarly, when a reference to an array instance is no longer required, its reference count is decremented. When the reference count for any array instance goes to zero, the array instance is destroyed or de-allocated, and any memory and resources allocated during its construction are reclaimed in a garbage collection process.

Native objects are, at least in some cases, not directly exposed to the end user 105 in the client programming environment. Instead, the user programs his/her application (using input 106) against a shim or façade array type that represents a distributed array instance in the client programming language. Each shim object, in turn, contains a reference to a native distributed array.

A shim object or "shim array" may be instantiated in two different ways. First, when a new native distributed array is created (e.g. array 113), a shim array (111A) is also constructed on the master process (e.g. rank 0 (111)). Then, when a distributed function is invoked on the master process and one of its input arguments happens to be a shim array, the runtime on the master process serializes the shim array and communicates it to all the worker processes 120. On the worker processes, the runtime in turn deserializes the arguments from the master process and reconstitutes one or more shim arrays. Irrespective of how a shim array is created, there are two references to the underlying native partitioned array on each process (the first reference is held by the runtime itself and the second is held by the shim object).

Shim arrays support the default serialization interfaces in the client programming environment. For example, in the .NET programming language, the "ISerializable" interface is implemented, and in the Java programming language, the "Serializable" interface is implemented. When a shim array is serialized on the master process (e.g. 111), the only information that is written is the unique global identifier (111C). When this is deserialized on a non-master (i.e. worker) process, the default serialization framework may call a special deserialization constructor for the shim object. This constructor may perform two operations: first, it obtains the unique identifier and, second, looks up the reference to the distributed array on that rank through the distributed object registry.

When a collective function completes, the shim objects on all but the master process go out of scope and are marked for garbage collection (in the case of garbage-collected programming environments such as .NET and Java), or are deterministically finalized in programming environments such as C++ and Python. When a shim object is finalized (irrespective of whether it is created on the master or non-master (worker) processes), the reference count of the underlying native distributed array object is decremented. After this operation in all but the master process, the reference count of the native object is one (and therefore, the object is still not disposed of entirely).

Once a distributed application invocation is complete, the distributed native array object on the master process still has a reference count of two. At some point in the user application, the shim object (111A) on the master (111) is either marked for garbage collection or is immediately disposed of. At that point, a finalizing method in the shim object executes two steps: 1) the first step decrements the reference count of the native object and 2) the second step adds the unique identifier (111C) to the native partitioned array object (113) to a "garbage-collection queue" consisting of global identifiers of the native partitioned array instances to be finalized across all processes. At specified points in time (such as before executing a distributed function), the master process may broadcast the queue of handles to all processes. Then, each process (including the master) performs a garbage collection step where it again decrements the reference count of the native object. At this point, the reference count of the native object goes to zero and the native object is de-allocated, freeing up any memory allocated in the native heap.

Accordingly, embodiments described herein support a variety of different client programming environments. Moreover, embodiments described herein do not require large amounts of client-specific code as other solutions have, particularly around command execution and object lifetime management. The principals and functionality described above will be described in greater detail below with regard to Figures methods 200 and 300 of FIGS. 2 and 3, as well as the embodiments described in FIGS. 4A, 4B and 5.

Figure 2:
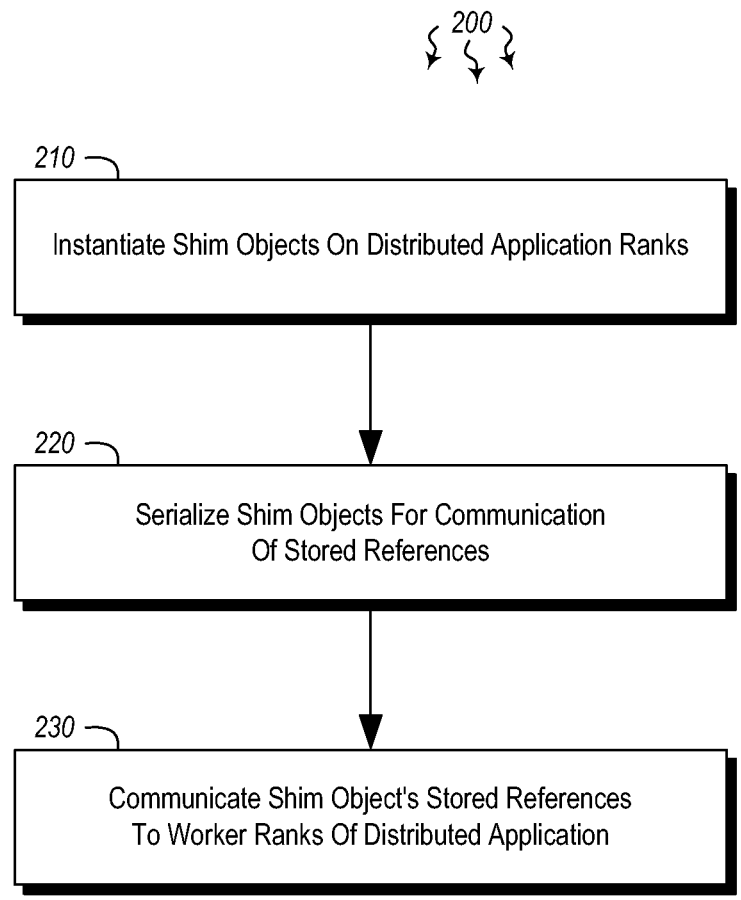
FIG. 2 illustrates a flowchart of an example method for using object serialization to communicate references to shim objects.
Figure 3:
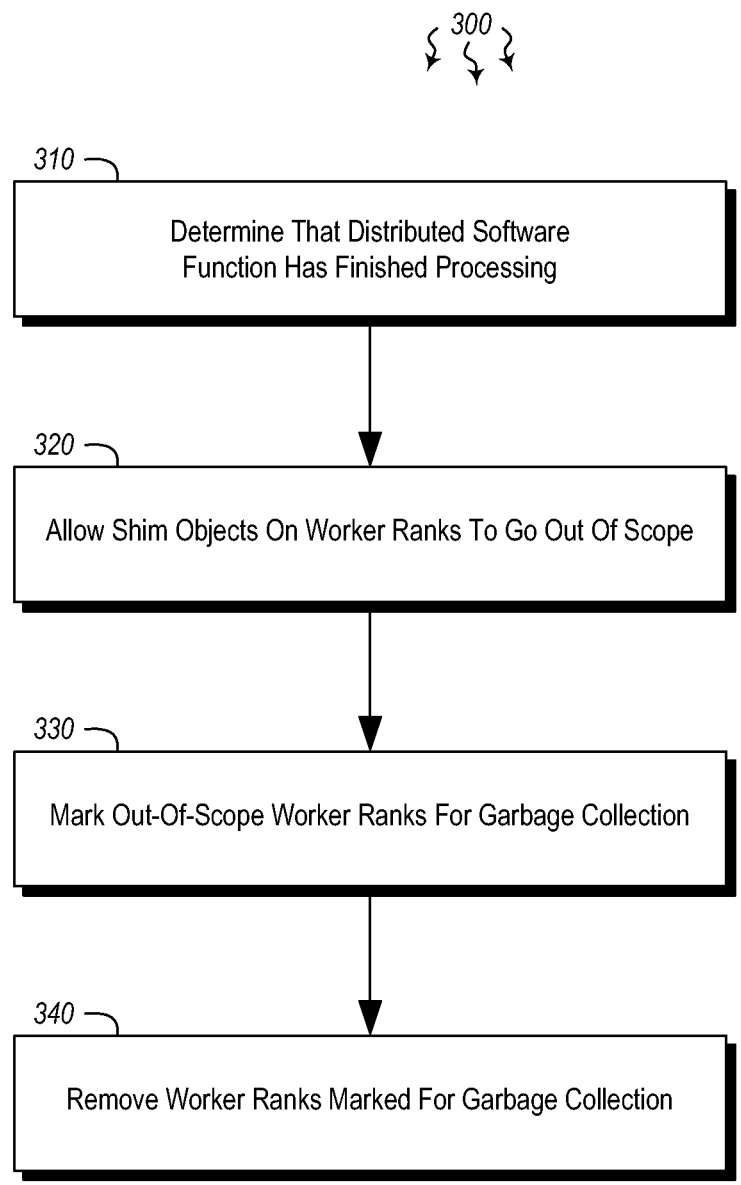
FIG. 3 illustrates a flowchart of an example method for managing memory on worker processes of a distributed software application.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for using object serialization to communicate references to shim objects. The method 200 will now be described with frequent reference to the components and data of environment 100 of FIG. 1.

Method 200 includes an act of instantiating shim objects on one or more ranks of a distributed application, the shim objects being configured to store a reference to an instance of a native partitioned array, the reference including a unique identifier for the native partitioned array instance (act 210). For example, shim object 111A may be instantiated on a rank 0 (master) process 111 in distributed application 110. The shim object includes a reference 111B to native partitioned array instance 113. The reference includes a unique identifier 111C that identifies the native partitioned array instance. The unique identifier of the stored reference may include an object registry that includes one or more key value pairs.

Figure 4A:
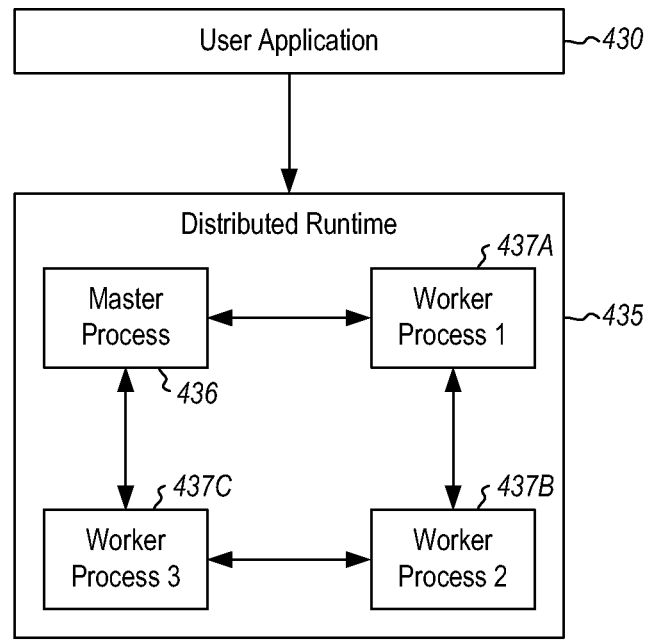
FIG. 4A illustrates an embodiment of a user application implemented in a distributed runtime.

The partitioned array instance may be programmed in one of a variety of different programming languages, as it is programming language-independent. As mentioned above, substantially any programming language may be used that supports basic operations such as user-overridable serialization and a means to run finalizers (deterministically or otherwise). In some cases, the shim object may be instantiated in response to receiving an indication that a distributed function has been invoked on master process 111 of the distributed software application 110. The master process may be one of many processes in a distributed runtime. Indeed, as shown in FIG. 4A, the distributed runtime 435 may include a master process 436 and worker processes 1, 2 and 3 (437A, 437B and 437C, respectively). At least in some embodiments, the sequential portion of the user's application 430 only runs on the master process 436. Other portions of the user's application that create and operate on distributed arrays may execute on both the master and worker processes. The master and worker processes are interconnected and can communicate through point-to-point and collective communication methods. Input arguments to the distributed function 430 are treated in a uniform manner by a runtime command dispatch of the distributed runtime 435.

Method 200 next includes an act of serializing the shim objects for communication of the stored references from the master rank of the distributed application to one or more worker ranks of the distributed application (act 220). For example, serialization module 115 may serialize either or both of shim objects 111A and 112A. The shim objects may be serialized 116 for communication of the references (111B/112B) and their corresponding unique identifiers (111C/112C) to various worker ranks 120 (or 473A-C in FIG. 4A). Each worker process may create (or be assigned to) its own distributed array. Each shim object may be part of a language-independent object framework that provides various partitioned array operations for distributed applications. For instance, the partitioned array operations may include memory management for the distributed application 110. Other such operations may include low-level structured communication operations or high-level unstructured communication operations such as global indexing.

Figure 4B:
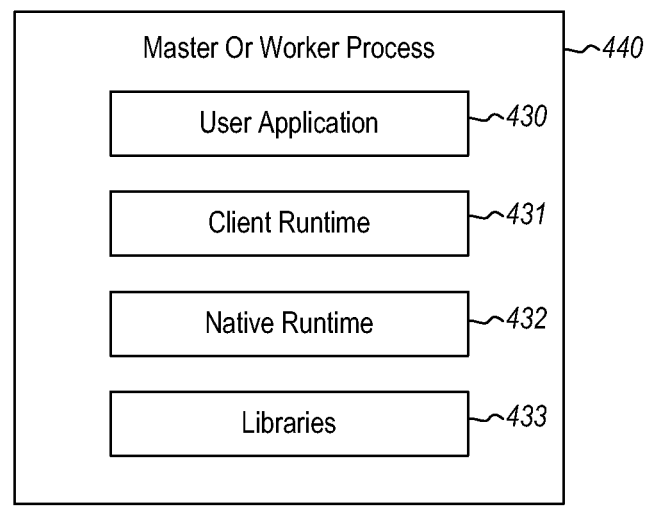
FIG. 4B illustrates an example master or worker process.

As shown in FIG. 4B, master and work processes 440 may include at least some of the same basic parts. The processes include (a) the user's application binary 430 (i.e. the distributed application) (b) the client runtime 431 (such as the .NET common language runtime (CLR), Java virtual machine (JVM) or an instance of the Python interpreter) that also contains the distributed shim layer and a command-execution framework (c) the native, language-independent runtime 432 consisting of the actual distributed objects and the distributed object registry, and (d) a set of libraries 433 that provide functionality such as mathematical operations on partitioned array, as well as infrastructure for lower-level communication, logging, profiling and error handling.

Figure 5:
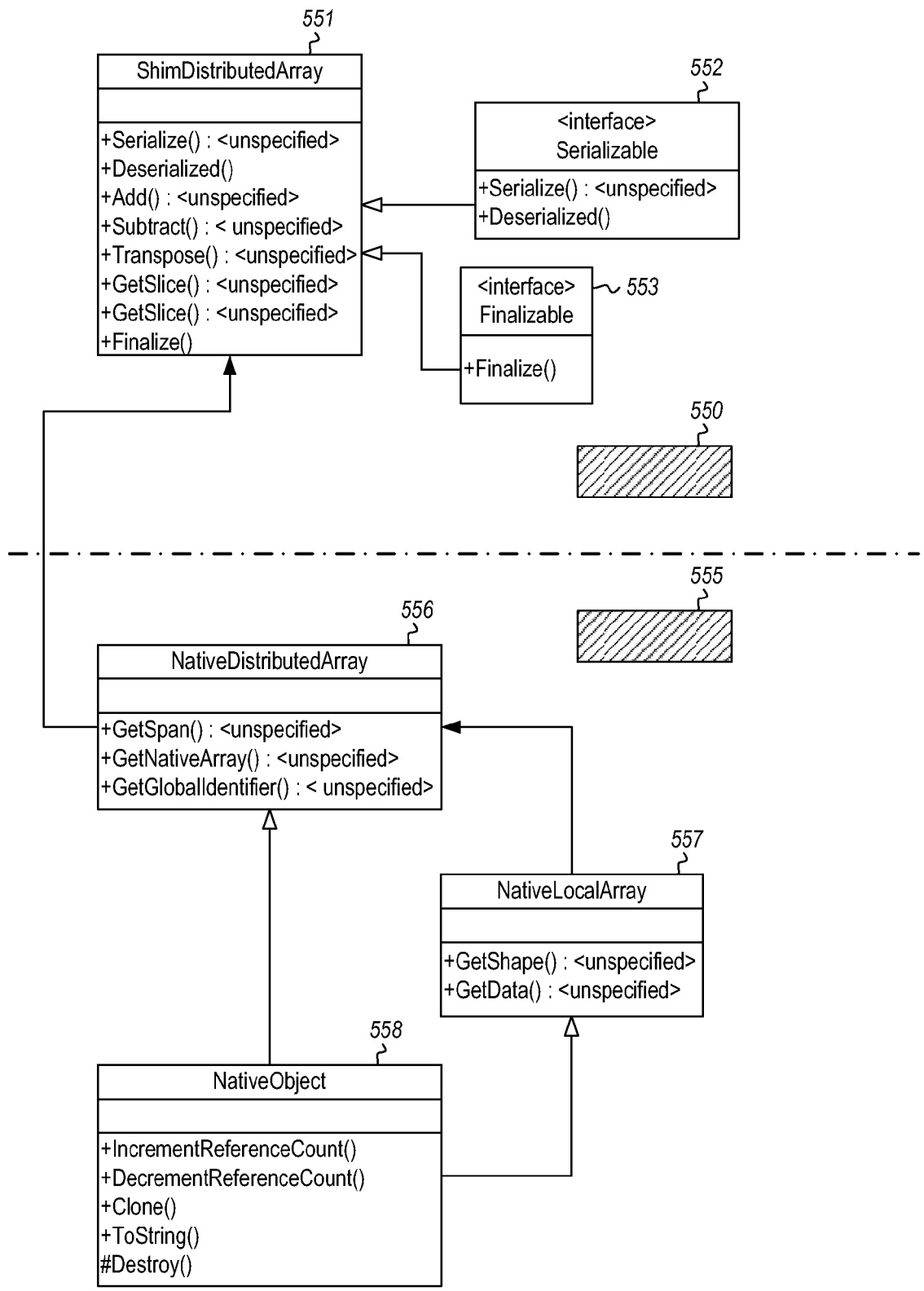
FIG. 5 illustrates an example representation of a distributed array in client and native runtimes.

FIG. 5 illustrates a representation of a distributed array in the client and native runtimes on each process illustrated in FIG. 4B. In the client runtime 550, the user's distributed application interacts only with "shim" distributed array objects 551. Each shim object only stores a reference to distributed array instantiated in the native runtime 555. Operations on the shim object (such as Add, Subtract, Transpose, etc. shown in element 551) are directly or indirectly dispatched to the corresponding set of operations on the native distributed object 556. The shim provides (among other things) implementations of three additional abstract methods or "interfaces" supported by the client runtime: Serialize (552), Deserialize (552) and Finalize (553). Serializing a shim object serializes the global identifier in the native object 556. Deserializing a shim object consists of deserializing the global identifier and looking up the underlying native distributed array instance in the native object registry. The native object registry 558 increments the reference count of the distributed object before returning it. Finalizing a shim object consists of calling a method that decrements the reference count on the native object. On the master process, it also includes adding the global identifier of the native object into the finalization queue in the distributed runtime.

Returning to FIG. 2, method 200 further includes, upon serializing the shim objects, an act of communicating the shim object's stored references to the one or more worker ranks of the distributed application (act 230). For example, serialized shim objects 116 may be communicated to various worker processes 120. As indicated above, various operations may be performed on the arrays associated with the unique identifiers included in the serialized shim objects. The operations that are to be performed on the native partitioned array (e.g. 113) are sent to the unique identifier in the stored references of the shim objects. Stored references to the native partitioned array instance include a counter that is incremented when the instance is assigned to a new reference. This counter is then decremented when at least one reference to the instance of the native partitioned array is no longer needed. Once the counter has been completely decremented (i.e. to zero), the array is marked for garbage collection and is destroyed. This will be explained further in regard to method 300 of FIG. 3.

FIG. 3 illustrates a flowchart of a method 300 for managing memory on worker processes of a distributed software application. The method 300 will now be described with frequent reference to the components and data of environment 100.

Method 300 includes an act of determining that a distributed software function has finished processing, the distributed software function including one or more shim objects instantiated on a master rank and one or more worker ranks of the distributed application, the shim objects being configured to store a reference to an instance of a native partitioned array, the reference including a unique identifier for the native partitioned array instance (act 310). Then, upon determining that the distributed software application 110 has finished processing, method 300 includes an act of allowing the shim objects instantiated on the worker ranks 120 to go out of scope (act 320). Shim objects that are out of scope are no longer needed by the distributed application and will eventually be removed in the garbage collection process.

In some cases, the computing system 101 will determine that at least one of the shim objects is finalized. This determination may be made regardless of whether the shim object was created on a master process (111) or on a worker process (112/120). Once the shim object is finalized (i.e. a reference to the shim object is no longer required), the reference count for that shim object (or for its corresponding native partitioned array instance) is decremented. Once the reference count has been decremented to zero, the native partitioned array instance is de-allocated. Thus, as described in method 300, the out-of-scope worker ranks are marked for garbage collection (act 330) and are removed during garbage collection (act 340). This removal or de-allocation may occur automatically whenever the reference count for a particular array has been decremented to zero.

Accordingly, methods, systems and computer program products are provided which use object serialization to communicate references to shim objects. Moreover, methods, systems and computer program products are provided which manage memory on worker processes of a distributed software application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for using object serialization to communicate references to shim objects, the method comprising:
   an act of instantiating shim objects on one or more ranks of a distributed application, the shim objects being configured to store a reference to an instance of a native partitioned array, the reference including a unique identifier for the native partitioned array instance;
   an act of serializing the shim objects for communication of the stored references from the master rank of the distributed application to one or more worker ranks of the distributed application; and
   upon serializing the shim objects, an act of communicating the shim object's stored references to the one or more worker ranks of the distributed application.

2. The method of claim 1, wherein the shim is instantiated in response to receiving an indication that a distributed function has been invoked on a master process of a distributed software application.

3. The method of claim 1, wherein input arguments to a distributed function are treated in a uniform manner by a runtime command dispatch.

4. The method of claim 1, wherein each worker process creates its own distributed array.

5. The method of claim 1, wherein the partitioned array instance is programming language-independent.

6. The method of claim 1, wherein one or more operations that are to be performed on the native partitioned array are sent to the unique identifier in the stored reference of the shim object.

7. The method of claim 1, wherein the shim objects are part of a language-independent object framework providing one or more partitioned array operations.

8. The method of claim 7, wherein at least one of the partitioned array operations comprises memory management.

9. The method of claim 7, wherein at least one of the partitioned array operations comprises a low-level structured communication operation.

10. The method of claim 7, wherein at least one of the partitioned array operations comprises a high-level unstructured communication operation.

11. The method of claim 10, wherein the high-level unstructured communication operation comprises global indexing.

12. The method of claim 1, wherein the unique identifier of the stored reference comprises an object registry that includes one or more key value pairs.

13. The method of claim 1, wherein the stored reference to the instance of the native partitioned array instance includes a counter that is incremented when the instance is assigned to a new reference.

14. The method of claim 1, wherein the stored reference to the instance of the native partitioned array instance includes a counter that is decremented when at least one reference to instance of the native partitioned array is no longer needed.

15. At a computer system including at least one processor and a memory, in a computer networking environment including a plurality of computing systems, a computer-implemented method for managing memory on worker processes of a distributed software application, the method comprising:
   an act of determining that a distributed software function has finished processing, the distributed software function including one or more shim objects instantiated on a master rank and one or more worker ranks of the distributed application, the shim objects being configured to store a reference to an instance of a native partitioned array, the reference including a unique identifier for the native partitioned array instance;
   upon determining that the distributed software application has finished processing, an act of allowing the shim objects instantiated on the worker ranks to go out of scope;
   an act of marking the out-of-scope worker ranks for garbage collection; and
   an act of removing the worker ranks marked for garbage collection.

16. The method of claim 15, further comprising determining that at least one of the shim objects is finalized, regardless of whether the shim object was created on a master process or on a worker process.

17. The method of claim 16, wherein a reference count of the underlying native partitioned array instance is decremented.

18. The method of claim 16, wherein upon decrementing the reference count to zero, the native partitioned array instance is de-allocated.

19. The method of claim 18, wherein the de-allocation occurs automatically when the reference count is decremented to zero.

20. A computer system comprising the following:
   one or more processors;
   system memory;
   one or more computer-readable storage media having stored thereon computer-executable instructions that, when executed by the one or more processors, causes the computing system to perform a method for using object serialization to communicate references to shim objects, the method comprising the following:
     an act of instantiating shim objects on one or more ranks of a distributed application, the shim objects being configured to store a reference to an instance of a native partitioned array, the reference including a unique identifier for the native partitioned array instance, the shim being instantiated in response to receiving an indication that a distributed function has been invoked on a master process of a distributed software application;

an act of serializing the shim objects for communication of the stored references from the master rank of the distributed application to one or more worker ranks of the distributed application;

upon serializing the shim objects, an act of communicating the shim object's stored references to the one or more worker ranks of the distributed application; and an act of sending one or more operations that are to be performed on the native partitioned array to the unique identifier in the stored reference of the shim object.

* * * * *